United States Patent
Han et al.

(10) Patent No.: US 6,887,355 B2
(45) Date of Patent: May 3, 2005

(54) SELF-ALIGNED POLE TRIM PROCESS

(75) Inventors: Cherng-Chyi Han, San Jose, CA (US); Mao-Min Chen, San Jose, CA (US); Fenglin Liu, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 165 days.

(21) Appl. No.: 10/284,848

(22) Filed: Oct. 31, 2002

(65) Prior Publication Data

US 2004/0085674 A1 May 6, 2004

(51) Int. Cl.⁷ .......................... C23C 14/34; B05D 1/40; B05D 3/00
(52) U.S. Cl. .................. 204/192.34; 427/128; 427/130; 427/131; 427/132; 427/331
(58) Field of Search ................................ 427/128, 130, 427/131, 132, 331; 204/192.34

(56) References Cited

U.S. PATENT DOCUMENTS

| | | | |
|---|---|---|---|
| 5,874,010 A | 2/1999 | Tao et al. | 216/22 |
| 5,878,481 A | 3/1999 | Feng et al. | 29/603.15 |
| 5,901,432 A | 5/1999 | Armstrong et al. | 29/603.14 |
| 6,141,183 A | 10/2000 | Wu et al. | 360/126 |
| 6,243,939 B1 | 6/2001 | Chen et al. | 29/603.14 |
| 6,385,008 B1 * | 5/2002 | Santini et al. | 360/126 |
| 6,696,226 B1 * | 2/2004 | Dinan et al. | 430/320 |
| 6,737,281 B1 * | 5/2004 | Dang et al. | 438/3 |
| 6,778,357 B2 * | 8/2004 | Tabakovic et al. | 360/126 |
| 2001/0005301 A1 * | 6/2001 | Komuro et al. | 360/324.2 |
| 2003/0179498 A1 * | 9/2003 | Hsiao et al. | 360/126 |

\* cited by examiner

*Primary Examiner*—Steven Versteeg
(74) *Attorney, Agent, or Firm*—George O. Saile; Stephen B. Ackerman

(57) ABSTRACT

A method for forming a trimmed upper pole piece for a magnetic write head, said pole piece having a uniform width above and below a write gap layer. Prior art methods of trimming pole pieces to a final width using ion-beam etches produce pole pieces with thickness differentials due to the etch resistant nature of the alumina write-gap filling material. The present method uses NiCr, NiFeCr or Ru as write gap filling materials which have an etch rate which is substantially equal to the etch rate of the other layers forming the pole piece and are highly corrosion resistant.

9 Claims, 5 Drawing Sheets

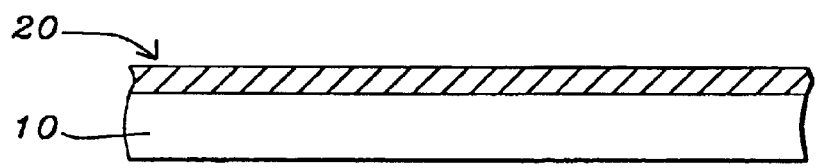
FIG. 1a – Prior Art
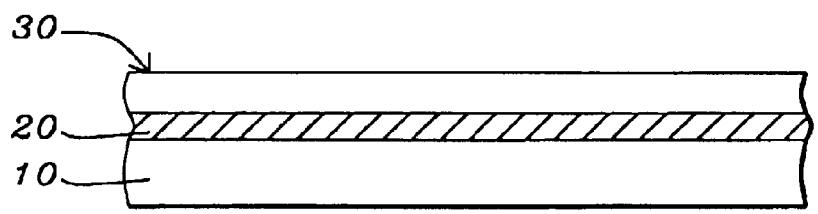
FIG. 1b – Prior Art
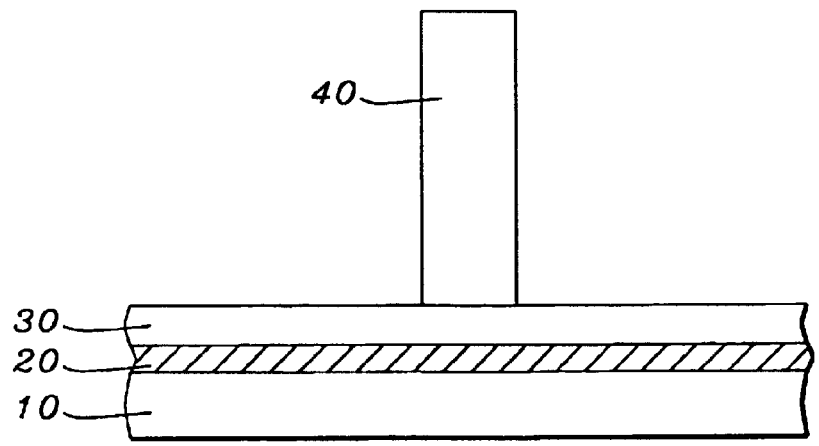
FIG. 1c – Prior Art

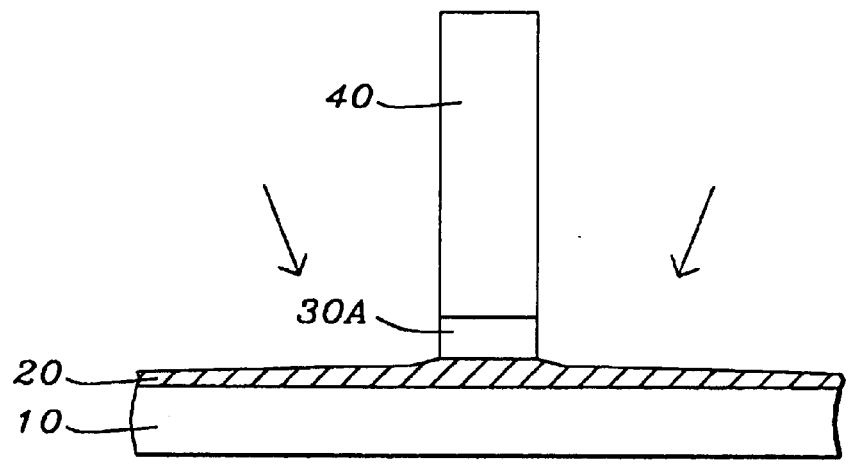
FIG. 1d – Prior Art
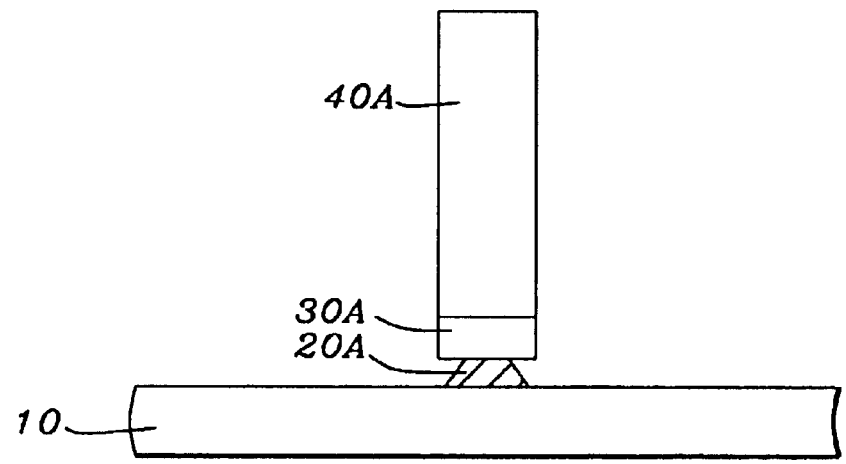
FIG. 1e – Prior Art
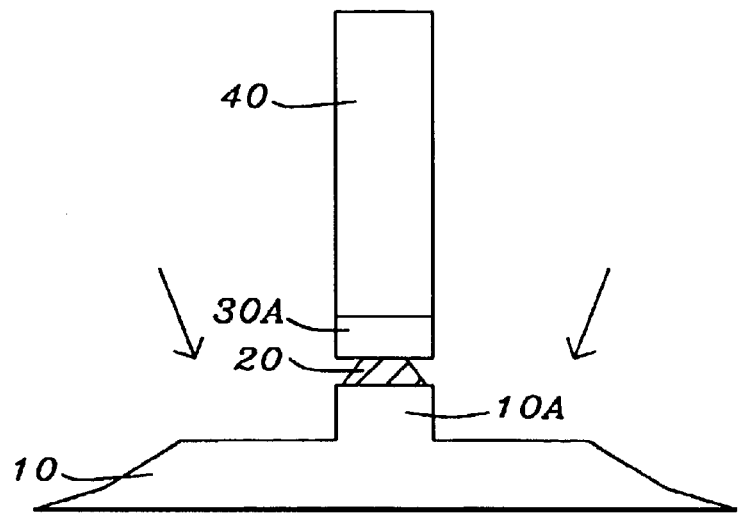
FIG. 1f – Prior Art

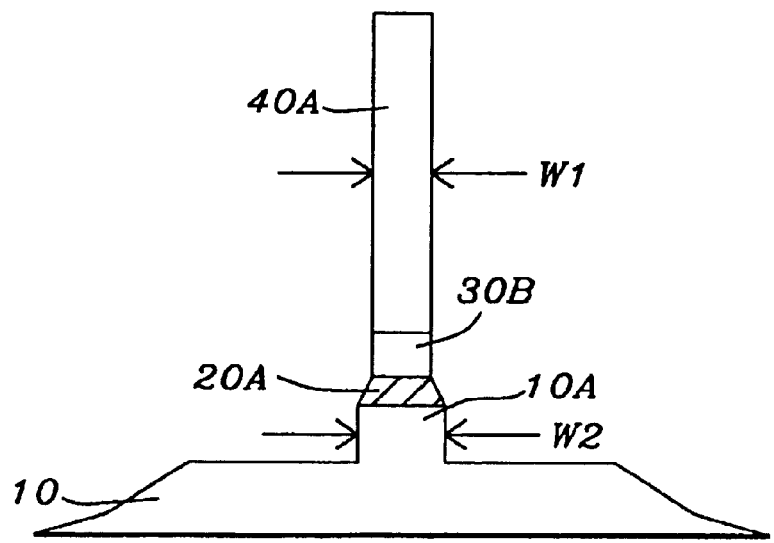
*FIG. 1g — Prior Art*
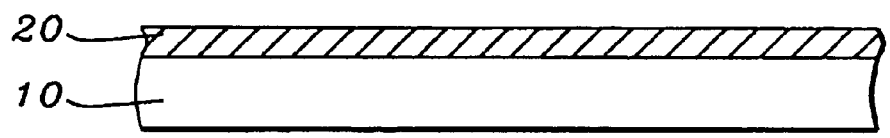
*FIG. 2a*
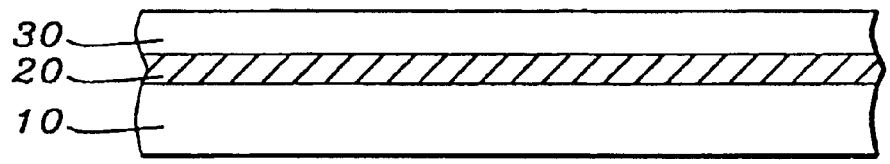
*FIG. 2b*

SELF-ALIGNED POLE TRIM PROCESS

BACKGROUND OF THE INVENTION

1. Field of the Invention

This invention relates to thin film magnetic write head fabrication procedures in general and, more specifically, to a method of forming and trimming an upper pole piece for such a write head.

2. Description of the Related Art

Thin film magnetic write heads are used to encode magnetically stored information on moving magnetic media such as tapes and discs. In the simplest terms, such a head consists of two pole pieces separated at the air-bearing surface (ABS) by a narrow gap (the write gap) and yoked together behind the ABS to form an approximately horseshoe-shaped assembly. A conductive coil is patterned between the pole pieces which, when electrically energized, induces a magnetic field between the poles which fringes across the gap. It is this induced field that encodes small magnetic regions in the moving medium.

The rapid changes in the state of the art have necessitated continual improvements in the area density of information that can be magnetically encoded and decoded in the moving medium. For a disk, this area density is a product of the number of recording tracks per mm measured radially, and the number of flux reversals per mm along the track, measured tangentially. With the development of the extremely sensitive magneto-resistive read heads, methods for improving the area density are now focussing on extending the limits of the inductive writing technology.

There are several approaches to improving the writing technology, one of which is to narrow track widths and thereby increase the number of tracks per mm. This approach requires that the writing tip of the magnetic pole assembly, including its write gap, be made as narrow as possible. In addition, the fringing fields extending beyond the width of the write gap should be minimized so that writing does not also occur on portions of the recording media away from the selected track. Such fringe field minimization requires the write gap to be formed in a symmetric pole piece. One way of forming such narrow, symmetric pole pieces and write gaps is to first form them with a relatively wide shape and then trim the shape to the desired width by means of an etching process, which, typically is a series of ion-beam etches (IBE) or milling process. These etching processes are time consuming and lead to undesirable width discontinuities between various portions of the pole piece. A prior art method of producing a trimmed upper pole piece as presently practiced by the inventors is taught by Chen et al. (U.S. Pat. No. 6,243,939) and is more briefly described herein with reference to FIGS. 1a–1g. Referring to FIG. 1a there is shown a schematic cross-sectional view of a write gap (WG) layer (20) formed on a lower shield (10) of a read/write head. As is typical in the prior art, the material of choice for forming a write gap layer is alumina. Referring to FIG. 1b, there is shown the configuration of FIG. 1a with the addition of a seed layer (30), which will form the basis for subsequent deposition of a plated portion of the pole piece. Referring next to FIG. 1c, there is shown a monolithic plated pole portion (40) formed on the seed layer. The monolithic plated pole portion is plated to a uniform width within a form (not shown) in a manner well known by practitioners of the art. Referring to FIG. 1d, there is shown the fabrication of FIG. 1c wherein a substantial portion of the seed layer (30) has been removed by an ion-beam etch (indicated approximately in direction by the arrows) leaving a portion (30A) remaining beneath the plated pole portion (40) and also leaving the WG layer (20) shaped as shown. Referring next to FIG. 1e, there is shown the fabrication of FIG. 1d wherein a portion of the WG layer has been removed by an etching process, typically a wet chemical etch, leaving the WG layer undercut as shown (20A). This undercut is necessary to eliminate portions of the WG layer that would hinder the progress of the etching operation because of its high etch resistance. It is noted that controlling the formation of the undercut regions is difficult in practice and can introduce additional width variations as the process continues. It is further noted that the undercutting of the WG layer is subsequently responsible for the disadvantageous width variations that the present invention eliminates.

Referring next to FIG. 1f, there is shown the fabrication of FIG. 1e wherein the shield layer (10) has been shaped by a low angle IBE (indicated by arrows) to leave a pedestal (10A) beneath the plated pole portion. Finally, with reference to FIG. 1g, there is seen the fabrication of FIG. 1f wherein a final high angle IBE trim (see arrows) has narrowed the width of the plated pole portion (40A) and the seed layer beneath it (30B) to the desired width. The figure also illustrates the disadvantage of the method in that there is a width discontinuity between W1, the common width of the pole piece and seed layer, and W2, the width of the pedestal portion of the shield (10A). This discontinuity is caused by the non-uniform width of the write gap layer (20A) which shields the pedestal (10A) from the effects of the IBE because the wider base of the write gap layer acts as a mask to block the high angle IBE and prevent thinning of the shield pedestal (10A).

Tao et al. (U.S. Pat. No. 5,874,010) teach a method of pole trimming wherein a mask of nitride-forming refractory metal is deposited on the top of the pole piece to be trimmed and then a energetic beam of nitrogen ions is used to etch away the sides of the pole piece not protected by the mask. Feng et al. (U.S. Pat. No. 5,878,481) teach the formation of a pole piece wherein the WG layer is alumina and wherein an anisotropic reactive ion etch is used which has a 2:1 etch selectivity for the WG layer with respect to the upper pole layer and a 1:1 etch selectivity of the lower pole layer with respect to the upper pole layer. Armstrong et al. (U.S. Pat. No. 5,901,432) teach a method of trimming a pole piece wherein the WG layer of nickel phosphorus is initially formed to the correct thickness by electroplating it within a photoresist form. Thus, the ion-beam milling is not required to remove any of the WG layer since it is already of the correct dimensions. Wu et al. (U.S. Pat. No. 6,141,183) teach a method for trimming a pole piece by forming, on a shield and write gap layer, an upper pole piece with laterally extended flanges within a form having already the proper width. The flanges then serve as IBE milling guides to trim the gap and shield layer beneath them.

The prior art cited above does not address the problem associated with the method of pole trimming described in FIGS. 1a–1f. To address that particular problem the present inventors have discovered that the prior art WG material layer composition of alumina must be changed to avoid the differential IBE milling rate that causes the alumina protrusion and leads to the width differential of the pole piece section above and below the WG layer.

SUMMARY OF THE INVENTION

The object of this invention is to provide a method of trimming a write head pole piece that eliminates a width discontinuity between the portions of the pole piece above and below the write gap layer, said discontinuity then being responsible for disadvantageous writing characteristics such as the creation of adjacent track erasures during writing.

This object will be achieved through the formation of a write gap (WG) layer using corrosion resistant non-magnetic gap-filling material with a similar or substantially identical ion-beam etch (IBE) rate as the magnetic material forming the upper pole piece above the write gap and the magnetic material forming the shield, which is below the write gap layer. The use of such gap-filling material will eliminate the width discontinuity that results from the protrusion of a write gap layer of non-uniform width formed of more etch-resistant material. Such protrusion interferes with the effective ion-beam etching of the portion of the pole piece below the write gap layer.

BRIEF DESCRIPTION OF THE DRAWINGS

The objects, features and advantages of the present invention are understood within the context of the Description of the Preferred Embodiment, as set forth below. The Description of the Preferred Embodiment is understood within the context of the accompanying drawings, which form a material part of this disclosure, wherein:

FIGS. 1a–1g show a series of schematic air bearing surface (ABS) views of the formation and trimming of an upper pole piece using the method of the prior art. This method leads to a width discontinuity between the portions of the pole piece above and below the write gap.

FIGS. 2a–2f are a corresponding series of schematic air bearing surface (ABS) views of the formation and trimming of an upper pole piece using the method of the present invention.

DESCRIPTION OF THE PREFERRED EMBODIMENT

The present invention is a method of forming and trimming the upper pole piece of a magnetic write head such that the piece so formed is free of width discontinuities between the portions above and below the write gap layer.

A description of the preferred embodiment will be given in the context of the schematic drawings designated as FIGS. 2a–2f.

Referring first to FIG. 2a, we have as a starting point for the fabrication of the pole piece a shield layer (10) on which has been formed a write gap layer (20). The shield layer is typically a layer of magnetic material such as CoFeNi. In accord with the method to be practiced herein, the write gap layer is formed of a non-magnetic, corrosion resistant, gap-filling material whose IBE rate is substantially the same as the IBE rate of the shield layer material and the materials of the seed layer and plated pole portion which, together, will form the upper pole piece above the gap layer. For an IBE using Ar ions at a voltage of approximately 700 volts and a current of approximately 800 mA, gap-filling materials that satisfy the equal etch-rate criterion include NiCr, with a 40% atomic percentage of Cr, NiFeCr and Ru. For etching angles of 30°, 60° and 65° respectively, the etch rate ratios of NiCr/CoNiFe are 1.071, 1.18 and 1.052, while the etch rate ratios of Ru/CoNiFe are 1.018, 0.925 and 0.852. The NiCr is preferably formed to a thickness between approximately 500 and 1500 angstroms. In addition, all the materials above are highly corrosion resistant.

Referring next to FIG. 2b, there is shown the formation of FIG. 2a wherein a seed layer (30) has been formed on the write gap layer to enhance the plating process of the upper pole piece. The seed layer is preferably a layer of CoFeN formed to a thickness between approximately 1000 and 3000 angstroms.

Figure 2C:
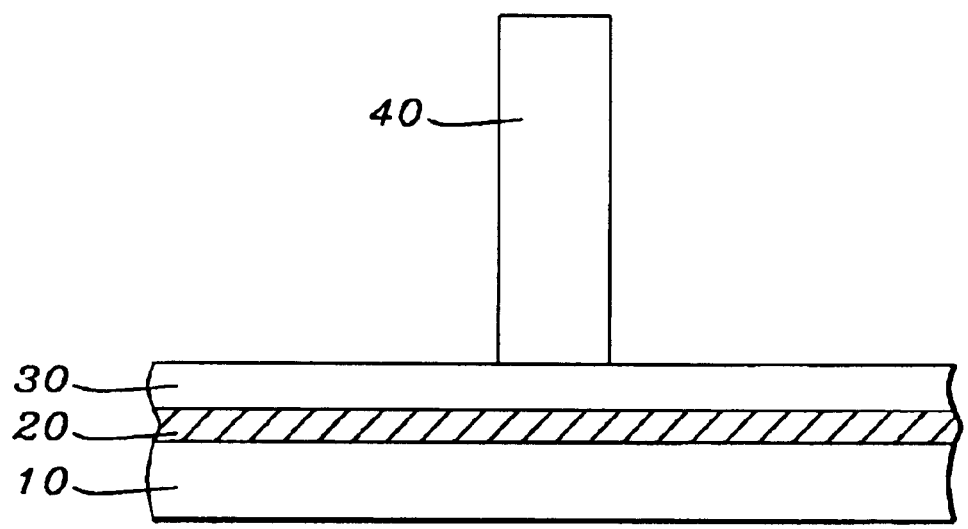

Referring next to FIG. 2c, there is shown the formation of FIG. 2b wherein a monolithic plated pole portion (40) has been plated onto the seed layer. The pole piece is preferably a layer of CoNiFe plated to a thickness (height) of between approximately 35,000 and 40,000 angstroms and an initial uniform width of between approximately 0.2 and 0.6 microns Referring next to FIG. 2d, there is shown the formation of FIG. 2c wherein an ion-beam etch (IBE) at an angle between approximately 30° and 40° has been used to remove the seed layer with the exception of a portion (30A) beneath the plated pole portion. The IBE has also removed portions of the write gap layer as schematically shown.

Figure 2D:
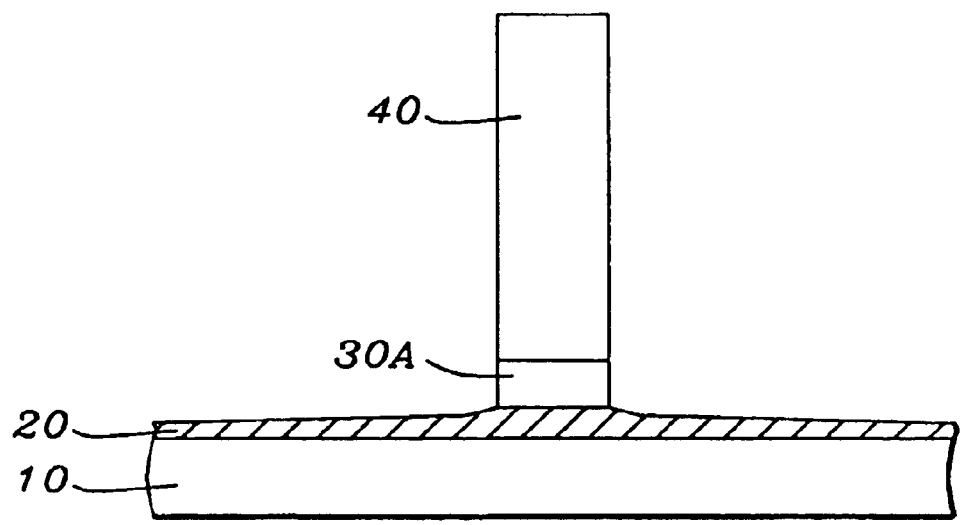
Figure 2E:
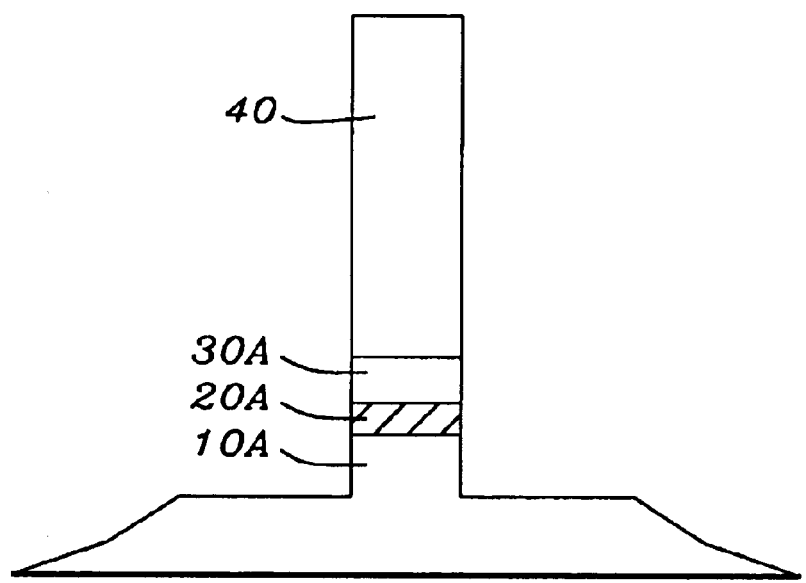

Referring next to FIG. 2e, there is shown the formation of FIG. 2d wherein a further IBE has removed portions of the shield layer and write gap layer leaving a pedestal in the shield layer (10A) beneath the plated pole portion and a remaining portion of the write gap layer (20A) situated between the shield layer pedestal and the seed layer (30A). Unlike the upper pole piece formed by the method of the prior art shown in FIG. 1e, the upper pole piece in this figure (seed layer plus plated portion) is characterized by a uniformity of width. In addition, it was unnecessary to undercut the WG layer as shown in prior art FIG. 1d, since the gap filling material of the present invention has the same etch rate as the shield and pole piece.

Figure 2F:
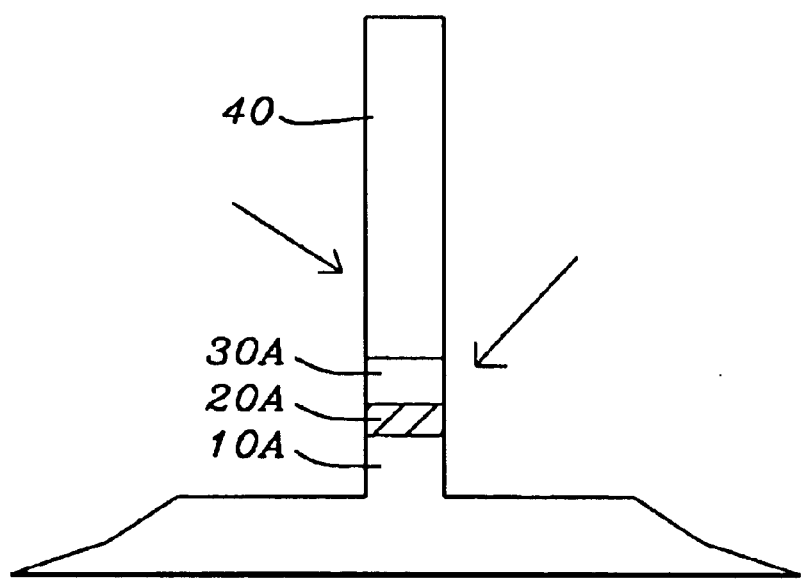

Referring finally to FIG. 2f, there is shown the formation of FIG. 2e now being trimmed to its final uniform width between approximately 0.1 and 0.4 microns by a high angle IBE, indicated by arrows as above.

As is understood by a person skilled in the art, the preferred embodiment and examples of the present invention are illustrative of the present invention rather than limiting of it. Revisions and modifications may be made to processes, structures and dimensions through which is formed a trimmed upper pole piece of uniform width in accord with the preferred embodiment of the present invention while still providing such a trimmed upper pole piece of uniform width in accord with the present invention and appended claims.

What is claimed is:

1. A method for forming a trimmed upper pole piece for a magnetic write head, said upper pole piece being of uniform width above and below a write gap layer, comprising:

providing a magnetic shield layer, said shield layer being formed of material having a first ion-beam etch rate;

forming on said shield layer a write gap layer, said layer being formed of material having a second ion-beam etch rate;

forming on said write gap layer a seed layer, said seed layer having a third ion-beam etch rate;

forming on said seed layer a plated upper pole portion, said plated pole portion being formed to a uniform initial width by a plating process and said pole portion being formed of material having a fourth ion-beam etch rate, wherein said first, second, third and fourth ion-beam etch rates are substantially equal;

trimming said shield layer, said write gap layer, said seed layer and said pole portion to form an upper pole piece of uniform final width above and below said write gap layer using an ion-beam in an ion-beam etching (IBE) process further comprising:

first using said ion-beam in a high angle IBE to remove portions of the seed layer laterally disposed to either side of the plated pole portion, leaving only a portion of the seed layer remaining beneath said plated pole portion;

next using said ion-beam in a shallow angle IBE to create a pedestal in the shield layer and trimming, thereby, the write gap layer to the width of said pedestal; and then using said ion-beam in a high angle IBE to produce a uniform width of the pedestal, the write gap layer formed on the pedestal, the seed layer formed on the write gap layer and the plated pole portion formed on the seed layer.

2. The method of claim 1 wherein the shield layer is formed of CoNiFe.

3. The method of claim 1 wherein the write gap layer is a layer of NiCr of 40% Cr by atomic percentage.

4. The method of claim 3 wherein the NiCr is formed to a thickness of between approximately 500 and 1500 angstroms.

5. The method of claim 1 wherein the write gap layer is a layer of NiFeCr formed to a thickness between approximately 500 and 1500 angstroms.

6. The method of claim 1 wherein the write gap layer is a layer of Ru formed to a thickness between approximately 500 and 1500 angstroms.

7. The method of claim 1 wherein the seed layer is a layer of CoFeN formed to a thickness between approximately 1000 and 3000 angstroms.

8. The method of claim 1 wherein the plated pole portion is a plated layer of CoNiFe formed to a thickness of between approximately 35,000 and 40,000 angstroms and a width of between approximately 0.20 and 0.60 microns.

9. The method of claim 1 wherein said ion-beam is a beam of Ar ions at a voltage of approximately 700 volts and a current of approximately 800 mA.

* * * * *